(12) United States Patent
Zenner et al.

(10) Patent No.: US 12,611,945 B2
(45) Date of Patent: Apr. 28, 2026

(54) CHARGING EQUIPMENT AND STORAGE FOR AN ELECTRIFIED VEHICLE

(71) Applicant: FORD GLOBAL TECHNOLOGIES, LLC, Dearborn, MI (US)

(72) Inventors: Thomas Zenner, Dueren (DE); Paul Fratter, Dusseldorf (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 780 days.

(21) Appl. No.: 17/741,920

(22) Filed: May 11, 2022

(65) Prior Publication Data

US 2022/0379752 A1 Dec. 1, 2022

(30) Foreign Application Priority Data

May 31, 2021 (DE) .......................... 102021114047.1

(51) Int. Cl.
*B60L 53/18* (2019.01)
*H01B 7/04* (2006.01)

(52) U.S. Cl.
CPC .............. *B60L 53/18* (2019.02); *H01B 7/041* (2013.01)

(58) Field of Classification Search
CPC ........................................................ B60L 53/18
USPC ........................................................ 320/109
See application file for complete search history.

(56) References Cited

U.S. PATENT DOCUMENTS

| | | | | |
|---|---|---|---|---|
| 9,741,473 | B2 * | 8/2017 | Hess | .................... H05K 9/0088 |
| 10,720,266 | B2 * | 7/2020 | Blackburn | .............. H01B 7/40 |
| 2011/0308835 | A1 * | 12/2011 | Piekny | .................. H02G 11/02 |
| | | | | 174/69 |

(Continued)

FOREIGN PATENT DOCUMENTS

| | | |
|---|---|---|
| DE | 102011080684 A1 | 2/2012 |
| DE | 102019003460 A1 | 1/2020 |
| DE | 102020202537 A1 | 9/2021 |

(Continued)

OTHER PUBLICATIONS

Torchinsky, Jason. Electric Car Charging Cables Only Need One Thing To Be so Much Better. https://jalopnik.com/. Jan. 11, 2017. 8 pages.

(Continued)

*Primary Examiner* — Nathaniel R Pelton
(74) *Attorney, Agent, or Firm* — David B. Kelley; Brooks Kushman P.C.

(57) ABSTRACT

Electrified vehicle charging equipment includes a charging cable having a cable body including insulated conductors surrounded by a sheath, the cable body including alternating first and second regions, the first regions containing a bistable resilient strip having a first extended stable state and a second curved stable state, the bistable resilient strip resisting an external force to move the first regions away from the first or second stable states and to move the first regions toward one of the first and second stable states when the first regions are not in the first or second stable states, a first plug connected to a first end of the cable body and configured to connect the plurality of insulated conductors to an electrified vehicle, and a second plug connected to a second end of the cable body and configured to connect the plurality of insulated conductors to a charging source.

20 Claims, 3 Drawing Sheets

(56)         References Cited

U.S. PATENT DOCUMENTS

2017/0158068  A1 *    6/2017   Dowell  ................ H02G 11/006

FOREIGN PATENT DOCUMENTS

FR          2990049  A3    11/2013
JP        2010179784  A      8/2010
JP        2014073034  A      4/2014
WO    WO 2020/201616      *  10/2020

OTHER PUBLICATIONS

German Search Report for German Application No. 102021114047.1
mailed Jan. 31, 2022, 10 pages.

* cited by examiner

20

Z

X

21

23

1, 22

20

Z

X

21

23

1, 22

20

21

Y

X

23

22

1

10

CHARGING EQUIPMENT AND STORAGE FOR AN ELECTRIFIED VEHICLE

CROSS-REFERENCE TO RELATED APPLICATIONS

This application claims foreign priority benefits under 35 U.S.C. § 119(a)-(d) to DE Application 10 2021 114 047.1 filed May 31, 2021, which is hereby incorporated by reference in its entirety.

TECHNICAL FIELD

This disclosure relates to electrified vehicle charging equipment and storage of charging equipment in an electrified vehicle.

BACKGROUND

Electrified vehicles including fully electric vehicles and plug-in hybrid vehicles are becoming increasingly important as alternatives to motor vehicles that rely solely on an internal combustion engine. In addition to vehicles that obtain their energy from fuel cells, electric vehicles which have a rechargeable battery (or normally a multiplicity of rechargeable batteries or battery packs) are especially common. These vehicles may include battery electric vehicles or BEVs (battery electric vehicles) as well as plug-in hybrid electric vehicles or PHEVs. For charging, the electrified vehicle is connected to a charging source via a cable, wherein different charging modes using correspondingly different cables are possible. In this regard, four different charging modes have been defined in IEC 61851, which are often referred to as mode 1 to mode 4 (or charging mode type 1 to 4). In mode 1, the cable serves exclusively for energy transfer (and normally grounding). In mode 2, the cable has a signaling device (resistance coding), which indicates the current limit of the charging source to the charging electronics on the vehicle. In mode 3, two-way communication between the charging source and the vehicle via the charging cable is additionally possible. Mode 4 is provided for direct-current charging procedures, in which two-way communication between the vehicle and the charging source likewise takes place. Few vehicles utilize mode 1 compared to modes 2, 3, and 4, which are advantageous in terms of the achievable charging power and associated economics. Public charging stations, in which the charging cable can also be fixedly connected to the charging source typically implement mode 3 (and/or mode 4). Mode 2 enables charging of the electric vehicle via a common household connection.

If the charging station or charging source does not provide a charging cable, at least one such cable must be carried in the electric vehicle. To enable charging at different infrastructures, electric vehicles may be equipped with (at least) two different charging cables: a mode 2 charging cable and a mode 3 charging cable. The storage of one charging cable already takes up valuable storage space in the trunk or frunk, which is even more true for the storage of two charging cables. The problem of housing the cable can currently be reduced by storing a helically wound, elastic charging cable that can be extended during use. Without external forces, the cable reverts to its space-saving helical form. In this case, the elastic properties are normally predominantly based on the sheath or insulation of the cable. This is disadvantageous in that the restoring forces, which increase with the deflection of the cable, hinder the handling of the cable. Owing to the mechanical tension, it is moreover difficult to bring the charging cable near to the ground, i.e. the cable becomes an obstacle between the charging source and the electric vehicle during use.

US 2017/0158068 A1 discloses a vehicle charging cable, which assumes a slack state during the charging of the vehicle. The cable comprises a body, one or more wires accommodated in the body, a first pretensioner for pre-tensioning a body portion and a second pretensioner for pre-tensioning at least part of the body portion. The second pretensioner responds to an external stimulus and serves to counteract the pretension of the first pretensioner so that the vehicle charging cable assumes a slack state. The second pretensioner can comprise, for example, a shape-memory alloy, which can be activated by an electrical current flow.

A device for positioning a charging cable for an electrically operable vehicle is known from DE 10 2019 003 460 A1. This has, in addition to the charging cable, a cable channel in which the charging cable can be positioned, wherein the charging cable is guided through a respective through-opening comprising a plurality of rounded segments. A predefined tensile stress can be applied to the charging cable via a tensioning device, wherein, under the predefined tensile stress, a plug of the charging cable presses the rounded segments against one another so that the charging cable is aligned linearly in the cable channel.

U.S. Ser. No. 10/720,266 B2 discloses a cable arrangement, having a cable which comprises a wire and an insulator surrounding the wire, wherein the cable extends over a length between a first end and a second end and has a first stiffness. A sleeve surrounds the cable and a cable stiffener is coupled to the sleeve, wherein the cable stiffener can be deformed into a dimensionally stable form, wherein the cable stiffener has a second stiffness, which is greater than the first stiffness, in order to hold the cable in the dimensionally stable form. The cable stiffener comprises a first portion and a second portion, which is separate from the said first portion, wherein the first portion extends along a first bend in the cable and the second portion extends along a second bend in the cable.

JP 2010-179784 A discloses a stowage box part, which is provided in a rear bumper part of an electric vehicle. The stowage box part comprises a support element, which is fastened to a vehicle body, a box body, which is fastened to the support element, a bumper body having an opening, a reinforcing element, which is fastened to the bumper body, and a cover element, which can be opened and closed. The reinforcing element is arranged around the opening of the bumper body. A charging cable of the electric vehicle can be stored in the housing body.

SUMMARY

One or more embodiments according to this disclosure enable efficient stowage of a charging cable in or on an electrified vehicle.

It should be pointed out that the features and measures listed individually in the description below may be combined with one another in any technically reasonable manner and demonstrate further configurations of the claimed subject matter that may not be explicitly described or illustrated.

In at least one embodiment, an electrified vehicle includes an externally accessible storage compartment configured for storing or stowing battery pack charging equipment. The electrified vehicle is normally a road vehicle, for example a car or truck, but may include an electrically driven bicycle. In this context, the term "electric vehicle" or "electrified vehicle" relates both to purely electrically driven vehicles and plug-in hybrid vehicles. In any case, the electric vehicle has an electric motor, which can be operated via at least one battery belonging to the vehicle. In this regard, it is also possible to speak of a battery-operated electric vehicle (BEV).

The charging equipment has a charging cable for connecting the electric vehicle to a charging source, which charging cable has an at least partially flexible cable body. The term "charging equipment" can have a broad interpretation here. The corresponding charging equipment can have a plurality of components which are not (permanently) connected. At least the charging cable is used when connecting the electric vehicle to a charging source (charging station, domestic power supply etc.) and when charging the electric vehicle, whilst other optional components may not have a direct electrical function associated with the charging procedure, but represent accessories of the charging cable, for example.

Where a "charging cable" and "charging" of the vehicle are mentioned here, this does not rule out the electric vehicle, the charging cable and a charging source connected thereto also being configured for reverse energy transfer, wherein the electric vehicle can, for example, feed energy into the power supply (bidirectional charging).

A charging plug, which is designed for direct coupling to the charging source, is generally permanently connected to the cable body. The charging plug is configured for coupling to a particular type of charging source. For example, this can be a type 1 plug, or a type 2 plug, which is configured for mode 3 and connected to a corresponding charging station. Alternatively, the charging plug can also be provided for connection to a domestic power supply, for example a 110 VAC voltage supply in the USA using a 3-prong grounded plug, or a 230 VAC voltage supply in Europe using a Europlug, Schuko plug or the like. Here and below, the term "couple" is used synonymously with "connect", in particular "releasably connect".

Within the scope of the claimed subject matter, the charging cable may be permanently connected to the electric vehicle. However, in various embodiments, the charging cable has a vehicle plug, which can be coupled to a charging socket of an electric vehicle (and can also be disconnected therefrom). The vehicle plug can be coupled to the charging socket and, in this regard, is compatible therewith. By way of example, this can be a type 1 plug or a type 2 plug.

Whilst the charging plug and—if present—the vehicle plug are normally designed to be mechanically inflexible or rigid, the cable body, which normally accounts for the majority of the charging cable, is designed to be flexible, i.e. at least parts of the cable body are not rigid but can be substantially deformed in a non-destructive manner as a result of the application of a force. The cable body has a multiplicity of conductors which can fulfill different functions. In particular, for the energy transfer, at least one external conductor and a neutral conductor may be provided in addition to a ground wire. Furthermore—e.g. in a type 1 or type 2 plug—a proximity pilot signal conductor and a control pilot signal conductor can be provided. A contact in at least one of the above-mentioned plugs is associated with each of the conductors. The control pilot signal conductor serves for transmitting a control pilot signal. The proximity pilot signal conductor serves for transmitting a proximity pilot signal. As a result of the proximity pilot signal or PP signal, which can also be referred to as a presence signal or proximity signal, the electric vehicle can, on the one hand, establish the connection to a charging station per se; on the other, additional information relating to the characteristics of the charging station and/or the charging cable used can normally be derived from the proximity pilot signal, for example the maximum permissible current strength. The individual conductors are electrically insulated from one another and are normally collectively surrounded by an additional sheath, which enables electrical and mechanical protection along with flexibility of the cable body.

According to one or more embodiments, the cable body has a multiplicity of specified bending regions, of which each has a stable bent state with a greater curvature and, as a result of elastic deformation, can be brought out of the bent state and into a stable extended state with a smaller curvature, in which the specified bending region is stabilized in such a way that a spontaneous transition (i.e. without application of an external force) into the bent state is not possible. If a specified bending region is in a bent state, the cable body is bent in the specified bending region, i.e. it has a curvature which is greater than in the extended state which is still to be described below. The curvature in the bent state normally corresponds to a change in direction of at least 450, but possibly also at least 90°, or for example 180° (corresponding to a U shape).

As a result of elastic deformation, the specified bending region can be brought out of the bent state, i.e., for example, if a user exerts a force (or a bending moment) on the specified bending region, this results in a deformation which is, however, elastic. Accordingly, there is a restoring force or a restoring moment which seeks to return the specified bending region to the bent state. In this regard, the bent state can be referred to as "stable". However, as a result of a deformation of the specified bending region, it is furthermore possible to transfer it into a likewise stable extended state. In the extended state, the specified bending region is curved to a lesser extent than in the bent state, which includes the possibility of it being fully extended, i.e. linear. It can also be curved in the opposite direction. In the extended state, the specified bending region is stabilized such that it can no longer deform back into the bent state in a spontaneous manner, i.e. without the application of external forces or bending moments. It may also be said that the specified bending region stabilizes itself in the extended state.

Therefore, starting from the bent state, for example, if the user has deformed a specified bending region to the extent that the extended state is achieved, the specified bending region remains in this extended state so long as it is not subject to any external forces of sufficient magnitude to bring it out of the extended state. Therefore, a permanent bending moment does not have to be exerted on the specified bending region in order to prevent it from returning to the bent state. As a result of the specified bending region, upon assuming the bent state, a form of the charging cable is (at least partially) defined, which has a multiplicity of bends and is, in this regard, suitable for stowing the charging cable. In particular, as a result of the defined position of the specified bending regions, it is easily clear to the user at which points the charging cable should be bent in order to achieve an advantageous form for stowage (referred to below as "compact form"). If the charging cable is used for connecting the electric vehicle to the charging source, all specified bending regions can be in their respective extended state, for example, so that a maximum operating range of the charging cable is achieved. As a result of exerting a force or a bending moment on the respective specified bending regions, the user can easily transfer the specified bending regions to their bent states again after using the charging cable, wherein the deformation into the bent state is at least assisted or effected by the above-mentioned elastic restoring force. This means that, when preparing the cable for stowing in each case, the user does not have to consider at which points the cable needs to be bent for optimum stowability; rather, this is indicated by the specified bending regions. However, since the specified bending regions are stabilized in their respective extended state, the problem seen with elastic, e.g. helical or otherwise coiled cables of the prior art, which are under constant mechanical stress upon a deflection, making them substantially more difficult to handle, does not arise.

The cable behavior of embodiments according to the disclosure can be achieved in different ways. For example, a releasable locking mechanism may be incorporated in each specified bending region, by means of which the specified bending region can be locked in the extended state, for example by means of a snap connector or the like. In this case, the locking mechanism will counteract the elastic restoring force, which seeks to return the specified bending region to the bent or compact state. Another configuration provides that at least one specified bending region behaves in a mechanically bistable manner so that, starting from the bent state or from the extended state, in the event of a deformation up to an inverse state, an elastic return to the starting state takes place and, in the event of a deformation beyond the inverse state, a spontaneous transition into the other stable state in each case takes place. This means that, in this case, the specified bending region is not locked in the actual sense in the extended state, but, so long as the specified bending region is between the extended state and the inverse state, an elastic restoring force acts in the direction of the extended state. In the event of a correspondingly limited deflection from the extended state by an external force, a spontaneous return thereto therefore takes place. The same applies to the deformation from the bent state, so long as the inverse state is not exceeded. However, if the deformation goes beyond the inverse state, a continuing deformation into the other stable state in each case takes place without external forces. This means that the specified bending region can alternatively assume two stable states, which are elastically stabilized and correspond in each case to (local) energy minimums of the deformation energy stored in the specified bending region. The intermediate inverse state corresponds to a local energy maximum, starting from which either the stable extended state or the stable bent state is sought.

To achieve the above-mentioned effect, the cable body may contain a bistable spring element in at least one specified bending region. The spring element may be manufactured from an elastic material, for example spring steel or fiber-reinforced plastic. Such a bistable spring element may be incorporated for example in the sheath or surrounded by the sheath. The bistable spring element may be arranged between different conductors within the sheath. Since the conductors, as mentioned above, are themselves each electrically insulated, an electrically conductive spring element would also be unproblematic in this regard. The bistable spring element can itself assume two stable states, of which one corresponds to the bent state and the other to the extended state of the specified bending region.

The cable body may include a normal region that does not include a bistable spring element in between adjacent specified bending regions that include bistable spring elements. As such, the specified bending regions do not adjoin one another directly, but are spaced from one another by an intermediate normal region. On the one hand, to produce optimum stowability, it is generally unnecessary or even impractical if all optional bends of the charging cable adjoin one another; on the other, the illustrated properties of a specified bending region can generally only be achieved with increased complexity.

In this case, the cable body is configured to be non-rigid or monostably rigid in the normal regions compared to the adjacent specified bending regions. In the first case, a bending moment acting on the normal region, at least in the event of a limited deformation, does not result in a notable restoring moment, i.e. the normal region can be readily bent within certain limits, in contrast to the specified bending regions, which either generate a significant elastic restoring force in the direction of the respective stable state or for which a locking of the extended state firstly has to be released. The normal region may behave in a monostable rigid manner, i.e. that it has a single "normal state" from which it is elastically deformable. Irrespective of how great the deformation is, the normal region in this case always seeks to return to the same normal state, contrary to the specified bending regions.

In various embodiments, the length of a specified bending region is advantageously less than the length of an adjacent normal region. This can relate in particular to all specified bending regions and normal regions. Accordingly, lengthwise, the normal regions make up the greater percentage of the cable body. This may provide advantages in manufacturing as well as in handling of the cable by the user if the charging cable behaves more like a "normal" cable.

The respective spacing of two specified bending regions or the length of the intermediate normal region can be selected to differ. This ultimately defines the intended compact form in which the charging cable can be stowed. If the normal regions in the stowed state extend for example parallel (or anti-parallel) to one another so that the charging cable runs essentially back and forth, it can be advantageous if the lengths of two adjacent normal regions differ by a maximum of 20% or a maximum of 10%. In this case, each specified bending region should correspond to a change in direction of about 180°. By means of another configuration, however, other forms can also be defined, for example those of a rectangle with rounded corners, wherein each corner is represented by a specified bending region and the sides of the rectangle correspond to the normal regions. Each specified bending region would then correspond to a change in direction of about 90°. The lengths of adjacent normal regions can (in an irregular rectangular) essentially differ, whilst the length of a normal region corresponds approximately to the length of the next but one normal region, since these correspond to opposite sides of the rectangle.

As already mentioned, the specified bending regions serve for producing a defined compact form in which the charging cable can be easily stowed in a particular area provided for this purpose. The charging equipment preferably has a stowage compartment within the electric vehicle, in which the charging cable can be accommodated when all specified bending regions are in the bent state. If, for example, a rectangular form is defined by the specified bending regions in the bent state, the stowage compartment can likewise have a rectangular base area whereof the dimensions are at least approximately adapted to those of the charging cable in its compact form. If, as described above, the normal regions extend approximately parallel to one another in the compact form, the stowage compartment can have an elongated form adapted thereto. In this case, the length of at least one normal region can correspond in particular to between 60% and 90% of a dimension of the stowage compartment in the direction of the Y-axis. The stowage compartment may be designed to accommodate a multiplicity of charging cables for different types of charging sources.

The stowage compartment may be provided in the interior of the vehicle cabin or within the trunk, frunk, or custom compartment. However, an advantageous embodiment provides that the stowage compartment is formed with an opening accessible from an exterior of the vehicle with all vehicle doors and trunk closed. In one embodiment, the stowage compartment comprises a pull-out container arranged beneath a trunk or frunk of the electric vehicle. The container can be a pull-out container, i.e. it can be pulled out in the manner of a drawer (normally in the vehicle longitudinal direction). In this case, a wall of the container can form part of the exterior of the vehicle. As a result of the arrangement beneath the trunk or frunk, for example in the region of a rear or front bumper, space within the trunk/frunk is not needed and the charging cable is accessible at any time from outside the vehicle and irrespective of the current contents of the trunk or frunk.

Further advantageous details and effects of the invention are explained in more detail below with reference to a representative embodiment illustrated in the figures.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In the different figures, the same parts are denoted by the same reference signs and therefore are generally described only once.

Figure 1A:
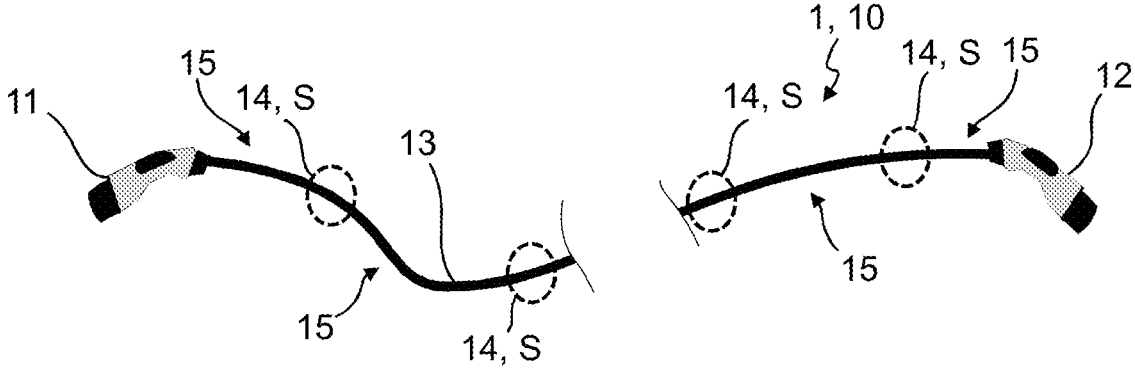
FIGS. 1A-1C show a schematic illustration of a charging cable of charging equipment in various states.
Figure 1B:
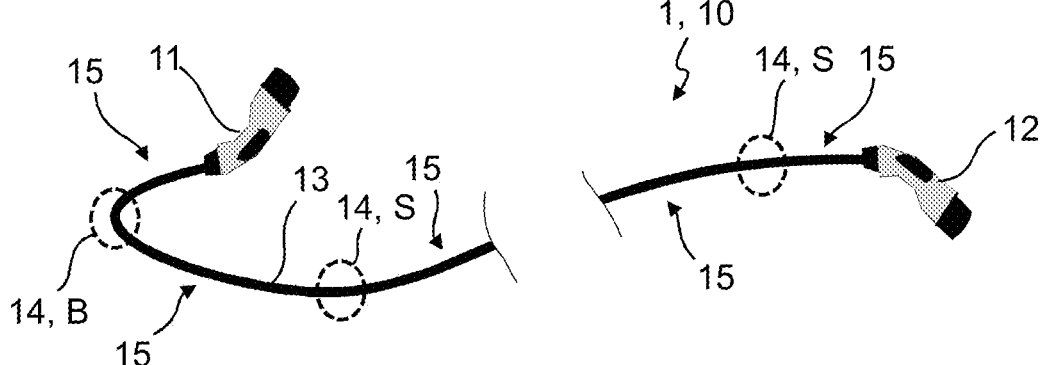
Figure 1C:
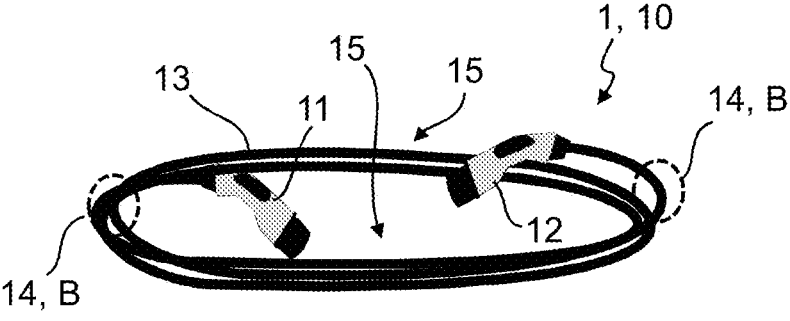
Figures 3A, 3B, 4:
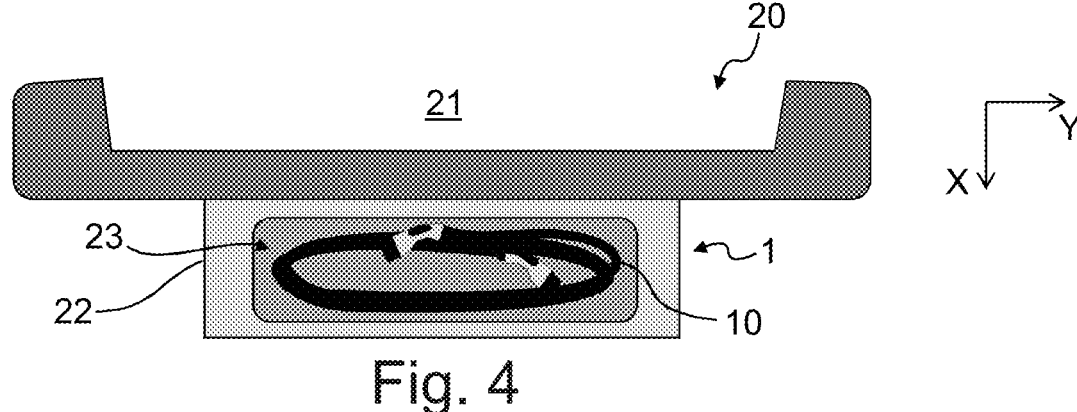
FIGS. 3A-3B show side views of an electric vehicle with a container configured for charging equipment.
FIG. 4 shows a plan view of a rear of the electric vehicle of FIGS. 3A-3B.

FIGS. 1A-1C show a schematic illustration of a charging cable 10 as part of charging equipment 1 for an electric vehicle 20 (FIGS. 3A-3C). The charging cable 10 has a flexible cable body 13, which has, at its ends, a vehicle plug 11 on the one hand for coupling to a charging socket of the electric vehicle 20 and, on the other, a charging plug 12 for coupling to a charging station (not illustrated). The two plugs 11, 12 are configured for mode 3 in this example and designed as Mennekes plugs, although this should be regarded as purely one example. In particular, the charging plug 12 could also be configured for mode 2 and designed for example as a three-prong grounded plug for use in the USA, or a Europlug or Schuko plug for use in Europe, or any similar plug.

The cable body 13 has a multiplicity of specified or designated bending regions 14 having a different construction relative to a multiplicity of normal regions 15, which, from the outside, are possibly only slightly visually distinguishable from one another, or not at all. In the present case, the specified bending regions 14 make up a total of less than 20% of the overall length of the cable body 13. Whilst the normal regions 15, as in a conventional charging cable, behave in a substantially non-rigid or generally flexible manner, the specified bending regions 14 exhibit a mechanically bistable behavior with two semi-rigid states and generally flexible in between the two semi-rigid states. Each of the specified bending regions 14 can assume either a first semi-rigid state S that is generally extended, straight, or linear, and a second semi-rigid state B that is generally curved, bent, or curvilinear. In FIG. 1A, all specified bending regions 14 are in their respective semi-rigid extended state S and may have a slight to negligible curvature. Accordingly, a maximum operating range for the charging cable 10 is realized.

If only a slight external force or an external bending moment acts on a specified bending region 14 while in the first semi-rigid extended state, a slight elastic deflection is produced and the specified bending region 14 is returned to its extended state S as a result of restoring forces. However, if the specified bending region is deformed beyond a predetermined range, an elastic return to the extended state S does not take place, but rather a further spontaneous transition occurs into the second semi-rigid bent state B, as illustrated in FIG. 1B with reference to a specified bending region 14. After exceeding predetermined deformation or deflection while in the first semi-rigid state, the specified bending region 14 is drawn into the second semi-rigid, bent state B as a result of elastic forces. The bent state B is likewise stable insofar as the specified bending region 14 can only be brought out of the bent state B in opposition to an elastic restoring force. If the elastic deformation has continued beyond a predetermined range, the specified bending region 14 in turn transitions into the stable extended state S. In FIG. 1C, all specified bending regions 14 are in the semi-rigid, stable bent state B, such that the charging cable 10 as a whole assumes a compact form, which is optimally suitable for stowing within the electric vehicle 20. In this case, the normal regions 15 are arranged approximately parallel or anti-parallel to one another and each specified bending region 14 corresponds to a change in direction in an order of magnitude of 180°, i.e. in an opposite direction. Apart from the normal regions 15 that adjoin the vehicle plug 11 and the charging plug 12, the lengths of most normal regions 15 are approximately identical and correspond approximately to four to five times the length of a specified bending region 14.

Figure 2A:
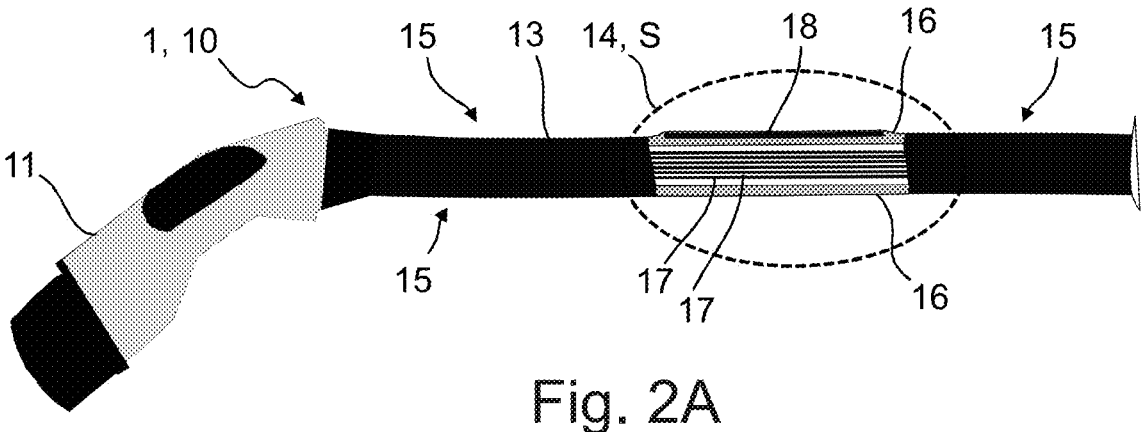
FIGS. 2A-2B show a partial sectional illustration of a detail of the charging cable of FIGS. 1A-1C in various states.
Figure 2B:
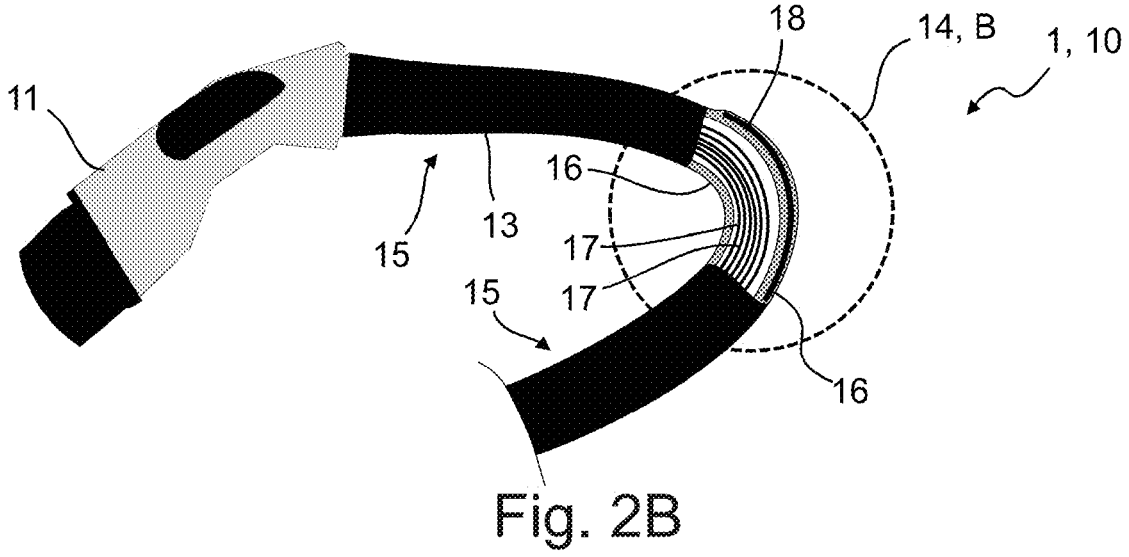

As can be seen in FIGS. 2A and 2B, the bistable behavior of the respective specified bending region 14 is achieved as a result of a bistable spring element 18, which may be incorporated in a sheath 16 of the cable body 13. The sheath 16 serves for mechanical protection and additional insulation of a multiplicity of conductors 17 within the cable body 13. The conductors 17, which are connected to corresponding contacts in the vehicle plug 11 and in the charging plug 12, also have, in addition to three external conductors, a neutral conductor and a ground conductor, a proximity pilot signal conductor and a control pilot signal conductor. The spring element 18 here is shown within the sheath 16; however, it could also be arranged on an outer side thereof, on an inner side thereof or even between the conductors 17. The dimensions of the spring element 18 and the sheath 17 are not drawn to scale here and may deviate from the actual ratios. In any case, the spring element 18, owing to its bistable properties, can be stabilized in two states (extended or curved), which in turn promotes the stabilization of the extended state S and the bent state B of the specified bending region 14.

FIGS. 3A and 3B show side views of a rear part of the electrified vehicle 20, which is in the form of a car here. Beneath a trunk 21, in the region of a rear bumper, the electric vehicle 20 has a container 22, which is likewise part of the inventive charging equipment 1. As illustrated in FIG. 3B, the container 22 can be pulled out rearwards in the direction of the X-axis (vehicle longitudinal axis), whereby a stowage compartment 23 within the container 22 is accessible. FIG. 4 shows a simplified plan view of the vehicle rear with the pulled-out container 22, wherein the charging cable 10 is housed in the stowage compartment 23 in its compact form according to FIG. 1C. The form of the stowage compartment 23 is adapted to the compact form of the charging cable 10 insofar as its extent in the direction of the Y-axis (vehicle transverse axis) is considerably greater than in the direction of the X-axis. The charging cable 10 can therefore be easily housed in its overall elongated stowage form. To achieve a desired utilization of space, the length of a normal region 15 in the present case corresponds to between about 70% to 80% of the extent of the stowage compartment 23 in the direction of the Y-axis.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. An electrified vehicle charging equipment, comprising:
a charging cable configured to electrically connect an electrified vehicle and a charging source, the charging cable having multiple bending regions, each bending region exhibiting mechanically bistable behavior with a stable semi-rigid bent state and a stable semi-rigid extended state in which each bending region in the bent state stays in the bent state in an absence of an external force acting on the bending region and each bending region in the extended state stays in the extended state in an absence of an external force acting on the bending region, each bending region exerting an elastic force that returns the cable to the extended state when in the extended state and acted on by an external force below a threshold, and moves the cable into the bent state when either the cable is in the extended state and acted on by an external force above the threshold, or when the cable is not in the extended state.

2. The electrified vehicle charging equipment of claim 1 wherein the stable semi-rigid bent state has a first curvature greater than a second curvature of the stable semi-rigid extended state.

3. The electrified vehicle charging equipment of claim 1 wherein the charging cable comprises a bistable spring element in each of the multiple bending regions.

4. The electrified vehicle charging equipment of claim 1 wherein the charging cable further comprises multiple unstable flexible regions, the flexible regions and the bending regions alternating with a flexible region between otherwise adjacent bending regions.

5. The electrified vehicle charging equipment of claim 4 wherein the charging cable comprises less than twenty percent bending regions.

6. The electrified vehicle charging equipment of claim 4 wherein length of each of the bending regions is smaller than length of associated adjacent flexible regions.

7. The electrified vehicle charging equipment of claim 1 wherein the charging cable comprises a cable body connected between a first plug at one end and a second plug at another end.

8. The electrified vehicle charging equipment of claim 1 wherein the charging cable comprises a cable body having a multiplicity of conductors surrounded by a sheath, and wherein each of the bending regions comprises a bistable spring.

9. The electrified vehicle charging equipment of claim 8 wherein the bistable springs are incorporated in the sheath of the cable body.

10. The electrified vehicle charging equipment of claim 8 wherein the bistable springs comprise fiber-reinforced plastic.

11. An electrified vehicle including the electrified vehicle charging equipment of claim 1.

12. An electrified vehicle charging equipment, comprising:
a charging cable having a cable body including a plurality of insulated conductors surrounded by a sheath, the cable body further including a plurality of first regions and a plurality of second regions, the first regions and the second regions alternating with a first region between otherwise adjacent second regions and a second region between otherwise adjacent first regions, the first regions containing and the second regions lacking a semi-rigid bistable resilient strip having first and second stable states; and
a plug configured to connect the plurality of insulated conductors to an electrified vehicle.

13. The electrified vehicle charging equipment of claim 12 wherein the semi-rigid bistable resilient strips comprise spring steel.

14. The electrified vehicle charging equipment of claim 12 wherein the semi-rigid bistable resilient strips comprise fiber-reinforced plastic.

15. The electrified vehicle charging equipment of claim 12 wherein the semi-rigid bistable resilient strips are integrated within the sheath.

16. The electrified vehicle charging equipment of claim 12 further comprising a second plug configured to connect the plurality of insulated conductors of the charging cable to a charging source.

17. The electrified vehicle charging equipment of claim 16 wherein the first regions comprise less than twenty percent of the cable body.

18. An electrified vehicle charging equipment, comprising:
a charging cable having a cable body including a plurality of insulated conductors surrounded by a sheath, the cable body further including a plurality of first regions and a plurality of second regions, the first regions and the second regions alternating with a first region between otherwise adjacent second regions and a second region between otherwise adjacent first regions, the first regions containing and the second regions lacking a bistable resilient strip having a first extended stable state and a second curved stable state, the bistable resilient strip resisting an external force to move the first regions away from the first or second stable states and to move the first regions into one of the first and second stable states when the first regions are not in the first or second stable states;

a first plug connected to a first end of the cable body and configured to connect the plurality of insulated conductors to an electrified vehicle; and a second plug connected to a second end of the cable body and configured to connect the plurality of insulated conductors to a charging source.

19. The electrified vehicle charging equipment of claim 18 wherein the bistable resilient strips comprise spring steel.

20. The electrified vehicle charging equipment of claim 18 wherein the first regions form less than twenty percent of the cable body.

\* \* \* \* \*